UNITED STATES PATENT OFFICE.

EDWARD DURYEE, OF LOS ANGELES, CALIFORNIA.

CEMENT AND PROCESS FOR MAKING THE SAME.

1,082,684.     Specification of Letters Patent.     Patented Dec. 30, 1913.

No Drawing.     Application filed November 8, 1910. Serial No. 591,372.

*To all whom it may concern:*

Be it known that I, EDWARD DURYEE, a citizen of the United States, residing at Los Angeles, in the county of Los Angeles and State of California, have invented a new and useful Cement and Process for Making the Same, of which the following is a specification.

The main object of the invention is to produce a hydraulic cement which when used with sand in the usual proportions will produce a mortar of greater strength and of greater increase of strength with age than is possible with the usual Portland cement.

A further object of the invention is to provide a relatively strong cement of comparatively low cost.

Another object of the invention is to provide a cement capable of forming a mortar especially adapted to resist the action of seawater, sewage or other corrosive agents.

Another object of the invention is to provide a cement capable of forming a mortar which will be waterproof and impervious.

Another object of the invention is to provide a cement capable of producing a mortar which will be free from efflorescence.

A further object of the invention will be to provide a cement capable of forming a mortar which will be resistant to high temperature and will be effective as heat insulation.

My invention is based on the use of infusorial or diatomaceous earth constituting a natural colloidal silica in combination with ordinary cement, such as Portland cement, and consists in grinding the infusorial or diatomaceous earth with the cement in such manner that the two are brought in intimate contact and in such finely divided condition that when mixed with the usual quantities of sand and water reactions and combinations will take place, changing the chemical nature of the product. The invention is, therefore, distinguished from a mere admixture of the diatomaceous earth with the Portland cement, in that the two materials are brought into such effective contact that the chemical, as well as the physical nature of the product changes.

The Pacific coast States abound in deposits of diatomaceous earth forming an abundant and cheap supply of raw material, so that in those States the use of the diatomaceous earth results in large reduction of the cost of cement. For the cement constituent, I may use ordinary Portland cement or natural cement, Portland cement clinker, or calcined natural cement rock, and it will be understood that the term "Portland cement," or "hydraulic cement," as herein used, includes the other stated cement products as equivalents for the purpose of this invention.

The strength and impermeability of my improved hydraulic cement will depend upon the proportions of diatomaceous earth and hydraulic cement and fineness of grinding. In my experience, I have found that the use of from ten to fifty per cent. of diatomaceous earth in the total product gives satisfactory results, according to the nature of the product desired. Such percentages of diatomaceous earth will render the cement waterproof and will make the resulting product with sand mortar stronger than if the ordinary Portland cement or hydraulic cement were used without the diatomaceous earth. A small proportion of dry hydrated lime may be added to the mixture before grinding, but this addition of hydrated lime is not essential.

For the manufacture of a standard hydraulic cement for ordinary purposes, I may proceed as follows: Diatomaceous earth and Portland cement are mixed in equal proportions and are ground together in any suitable grinding mill in a dry condition to a suitable condition of fineness. I have found that a fineness, such that approximately ninety per cent. will pass through a screen containing two hundred meshes to the lineal inch, gives satisfactory results. This fine grinding or grinding to a state of extremely fine division is necessary in order to produce the intimate contact of the particles of the hydraulic cement and diatomaceous earth which is required to effect the complete combination on contact of water. With the materials ground together in this manner and mixed with sand in the same proportions as with clear Portland cement, the resulting mortar is stronger than the clear Portland cement and sand mortar would have been and, in addition, has the more important advantage of being more impermeable and proof against the action of seawater, sewage and alkali water. The resulting mortar differs from the mortar with clear Portland cement and sand both in physical and chemical properties. Ordinary hydraulic cement is basic in character and the addition of the highly silicious diatomaceous earth gives a preponderant acidic character to the cement rendering the mortar more proof against the action of acid-corrosive agents, such as sewage, the silica of the diatomaceous earth combining with the lime set free in the cement in the setting operation, with the result that the lime is fixed in an insoluble hydrated mono silicate of lime. The colloidal nature of the diatomaceous earth and the fine grinding of the earth and of the cement by the regrinding operation and the intimate contact between the finely divided particles of diatomaceous earth and cement produced by the rubbing of them together in the grinding operation results in the presentation of the diatomaceous earth to the hydraulic cement in such manner that upon contact with water, there is a maximum tendency to chemical combination and to binding of the surfaces together. The highly colloidal nature of the diatomaceous earth is of importance in this connection, particularly in the filling of the pores of the mortar, but it is to be noted that the grinding of the earth together with the hydraulic cement is necessary to bring out the benefit of the colloidal nature as the action is essentially one of contact and it is essential that the contact of the acidic diatomaceous earth and basic hydraulic cement should be extended over as large a surface as possible. In fact the addition of the diatomaceous earth without grinding together with the cement is not found to produce the strengthening results attained by regrinding, and this would naturally result from the friability of the diatomaceous earth, for the reason that wherever such earth is not in contact with the hydraulic cement it will retain its natural friability and weakness and will impart these qualities to the mortar.

When it is desired to increase the hydraulicity of the cement, hydrated lime, in the proportions of, say, ten per cent. or less of the finished product, is added to the diatomaceous earth and hydraulic cement and ground therewith. The addition of the diatomaceous earth to the cement renders the product acidic in character, and the hydrated lime reacts with the excess of silica, when ground therewith and subsequently brought in contact with water.

Whereas Portland cement is a solid solution or gangue of lime silicates and aluminates, this improved cement is a solid solution in which the active silica is largely increased.

What I claim is:

1. The process of making cement which consists in finely grinding hydraulic cement with natural colloidal silica to reduce the said cement and diatomaceous earth to a finer state of division and to bring the finely divided particles thereof into intimate contact with one another.

2. The process of making cement which consists in finely grinding hydraulic cement with natural colloidal silica in approximately equal proportions.

3. The process of making cement which consists in finely grinding hydraulic cement with natural colloidal silica and hydrated lime.

4. The process which consists in finely grinding with ordinary basic hydraulic cement a sufficient quantity of silica in active form to convert the cement into an acidic cement.

5. A cement composed of natural colloidal silica compound finely ground with hydraulic cement.

6. A cement composed of natural colloidal silica finely ground with hydraulic cement and hydrated lime.

7. The process of making cement which consists in grinding hydraulic cement with natural colloidal silica and hydrated lime to such a fineness that approximately ninety per cent. (90%) will pass through a screen of 200 meshes to the lineal inch.

October 22, 1910.

EDWARD DURYEE.

Attest:
MILLARD STRYKER,
R. B. KEESE.

---

Copies of this patent may be obtained for five cents each, by addressing the "Commissioner of Patents, Washington, D. C."